United States Patent [19]
Ostroski

[11] Patent Number: 4,969,586
[45] Date of Patent: Nov. 13, 1990

[54] CHUTE CLOSURE DEVICE

[76] Inventor: Michael Ostroski, Dove Tail Furniture, R.D. 2, Rte. 100, Pottstown, Pa. 19464

[21] Appl. No.: 368,838

[22] Filed: Jun. 20, 1989

[51] Int. Cl.$^5$ .............................................. B65D 47/00
[52] U.S. Cl. .................................. 222/545; 222/536; 222/556; 193/4; 251/96; 251/111; 251/299
[58] Field of Search ................ 222/537, 545, 556, 536; 193/4, 5; 251/96, 97, 144, 299, 196, 111

[56] References Cited

U.S. PATENT DOCUMENTS

| | | | |
|---|---|---|---|
| 1,961,307 | 6/1934 | Stauffer | 193/4 |
| 2,850,259 | 9/1958 | Larson | 251/299 X |
| 3,249,192 | 5/1966 | Buskirk | 193/4 |
| 3,456,769 | 7/1969 | Prichard et al. | 193/4 |
| 3,578,283 | 5/1971 | Jones | 222/556 X |
| 4,372,730 | 2/1983 | Ladt | 222/536 X |

*Primary Examiner*—Andres Kashnikow
*Assistant Examiner*—Gregory L. Huson
*Attorney, Agent, or Firm*—Volpe and Koenig

[57] ABSTRACT

A delivery chute flow control device is disclosed. The device has a body portion which mates with the remainder of the delivery chute. Affixed to one end of the body portion is a rotatable door which is used to control the flow of material. A locking mechanism is provided as a way of securing the door in a fixed position.

18 Claims, 2 Drawing Sheets

CHUTE CLOSURE DEVICE

BACKGROUND OF THE INVENTION

The present invention relates generally to an apparatus for controlling the flow of materials in a delivery chute. More particularly, the present invention relates to an apparatus for controlling the flow of a liquid containing dense material. In particular, the present invention relates to an apparatus for controlling the flow of cementitious materials.

The use of delivery chutes for distributing cementitious materials from batch mixers is well known in the art. The mixer may be tracked or wheel mounted and the delivery to a particular site is often accomplished by attaching a plurality of chute sections, one to the other. Such delivery systems will be known to those skilled in the art.

As will be recognized by those skilled in the art, control over the flow of material in the chute has generally been limited to interrupting the delivery of material from the batch source. The inability to control the flow of material at the delivery point of the chute has been long recognized as a problem in controlling the flow of material through the chute.

With the foregone in mind, it is the general object of the present invention to address the disadvantages of the prior art. In particular, it is an object of the present invention to provide an apparatus or device which permits a flow control to be placed on the delivery chute.

The objects of the invention are accomplished by providing a closure control device having a body portion which is dimensioned to be compatible with the remainder of the chute. A first end of the device mates with the section of the delivery chute from the supply source. The other end of the device is provided with a hinged door which may be moved or positioned to interrupt the flow of the material through the chute. A locking means is provided for retaining the door in a closed position, whereby material flow is interrupted, or in an open position, whereby the flow of material is free of interruption.

DESCRIPTION OF THE PREFERRED EMBODIMENTS

Figure 1:
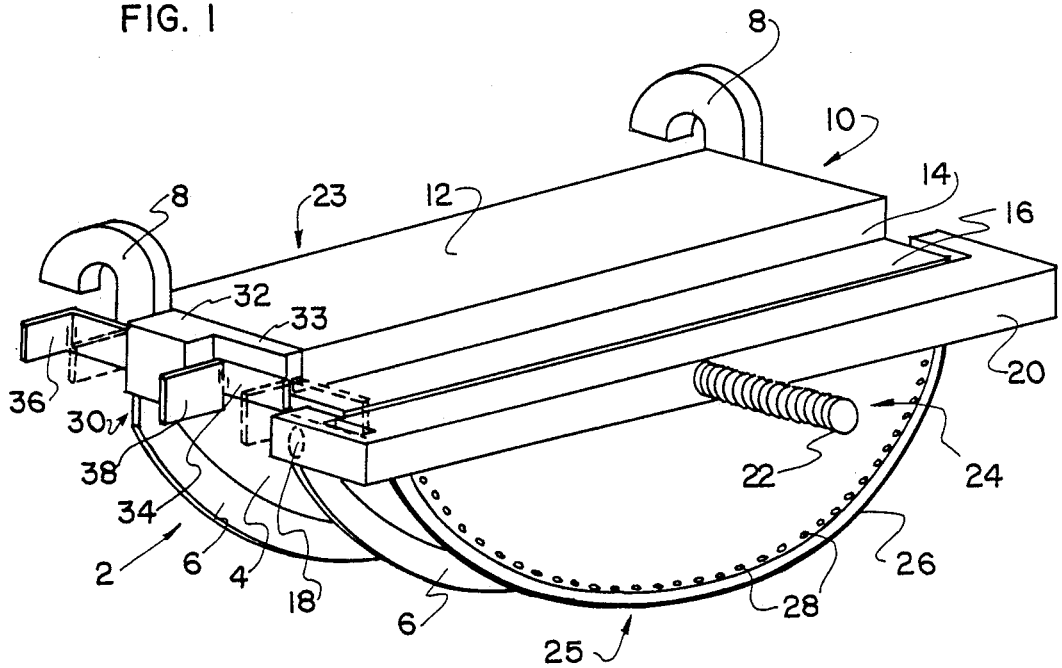
FIG. 1 is a perspective view of the chute closure device according to the present invention.

With reference to FIG. 1, there is shown a chute closure device or apparatus 2 in accordance with the present invention. As shown in FIG. 1, the exit or forward portion is closed by the door 24 and the entrance or rearward portion 23 is open and uninterrupted.

The chute closure 2 is comprised generally of a main body portion 4, having reinforcement ribs 6. In the preferred embodiment, the body portion 4 is approximately 6 to 8 inches long. However, it will be understood that body portion 4 could be an entire section of chute. The reinforcing ribs are spaced apart by 4 to 5 inches. The use of reinforcing ribs 6 as well as their number and particulars will depend on the strength of the body portion 4 and the weight of the material being transported. It is expected that some uses will not require reinforcing ribs. In the primary field of delivering cementitious materials, reinforced chute sections are common.

At the open end 23 of body portion 4, there are provided hooks or attachment means 8. The hooks or attachment means 8 secure the closure device 2 to the end portion of the preceding delivery chute, not shown, see FIG. 3. The main body portion 4, reinforcing ribs 6 and attachment means 8 will be familiar to those skilled in the art of delivering cementitious materials. These elements of the device are common in the industry and form no part of the present invention independent of the details described hereinafter.

As noted previously, the present invention utilizes a section of commonly available arcuately shaped delivery chute. To that section of delivery chute, there is attached a cover 10. The cover 10 comprises a first horizontal portion 12 which extends across the width of the body 4. The vertical portion 14 closes the front and sides of horizontal portion 12 and is affixed to the body member 4. A second horizontal portion 16 extends forward from vertical portion 14. The second horizontal portion 16 is boxed in much the same manner as the first horizontal portion 12 and forms the stationary portion of a hinge around which door 24 rotates. A hinge pin 18 extends through second horizontal portion 16. The U-shaped movable hinge portion 20, which is affixed to door 24, mounts adjacent the second horizontal portion 16 and rotates about the hinge pin 18. Affixed to movable hinge portion 20 is a handle 22 which assists in movement of the door.

The door 24 is comprised of heavy sheet material of approximately the same gauge as that utilized for the chute. In the preferred embodiment, the door 24 is semicircular or arcuate in shape so as to complement the chute and is sized to permit a gasket to abut the exit portion 25. The gasket 26 is attached to the door 24 by a plurality of fasteners 28. Since the primary purpose of the closure device is for fluid containing materials, the gasket 26 forms a seal which avoids excess fluid loss.

The position of door 24 is secured by the locking mechanism 30. The locking mechanism 30 is comprised of a bolt housing 32 which is secured adjacent to the vertical portion 14 and on about the same top horizontal plane as first horizontal portion 12. Bolt housing 32 is generally L-shaped. The finger portion 33 of housing 32 extends forward and serves to keep the bolt 34 from moving in the vertical plane when the bolt is in the forward position. The bolt 34 extends through the housing 32 and slides therein. The handle 36 is a combination slide handle and stop mechanism which limits the forward motion of the bolt 34. The handle 38 is a combination slide handle and stop which limits the rearward motion of the bolt 34.

Figure 2:
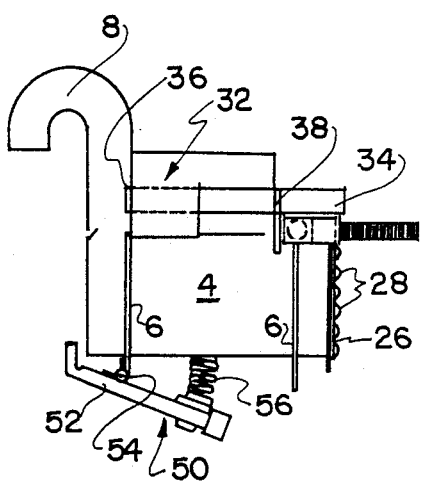
FIG. 2 is a partial diagrammatic left side elevation of the invention in FIG. 1, and illustrates the positioning of a lock means and the latching means for further securing the apparatus to mating chute.
Figure 3:
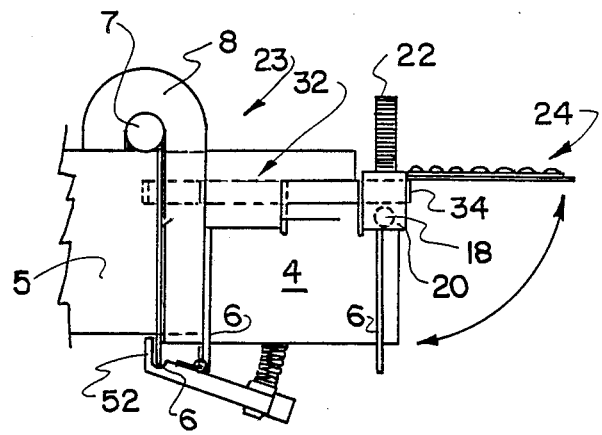
FIG. 3 is a partial diagrammatic left hand plan view of the chute device of FIG. 2 with the door in the open position and a section of the preceding delivery chute in place.

With reference to FIGS. 2 and 3, it can be seen that an opening 40 has been provided in the movable hinge member 20 on the side adjacent to and in line with the locking mechanism 30. With reference to FIG. 2, it can be seen that the door 24 will be secured in the down or closed position when the bolt 34 is extended forward and over the movable hinge 20. This prevents rotation of the hinge 20 about the hinge pin and secures the door in a closed position. In order to open the door, the bolt 34 is moved rearward and the door rotated about hinge 18. In order to secure the door 24 in the open position, the bolt 34 is moved forward and into opening 40. With bolt 34 in opening 40, movable hinge member 20 is prevented from rotating about hinge pin 18 and the door is secured in the open position.

Referring now to FIG. 2, there is shown a latching mechanism for securing the chute closure 2 to an adjacent chute member, not shown. The latching mechanism 50 is comprised of a J-shaped finger lever 52 which is secured to a rib 6 by the hinge 54. Lever 52 will rotate about the hinge 54 and move in the vertical plane. A biasing spring 56 is provided between the lever 52 and the body portion 4. Biasing spring 56 will normally bias the forward portion of lever 52 downwardly and, therefore, the rearward latch portion of lever 52 will be normally biased in the upward position. The specific mounting of latching mechanism 50 will depend on the chute configuration, however, the above description will be sufficient to enable those skilled in the art to appreciate the locking feature.

With reference to FIG. 3, it can be seen that the latch mechanism 50 will secure the rearward portion of the chute closure device 2 to the forward portion of a mating chute 5. After mating, the rib 6 of chute 5 will be secured by the lever 52 of a latch mechanism 50. In this manner, separation of the lower portions of the chutes is avoid as the load is increased behind a closed door 24.

Still with reference to FIG. 3, the relationship between attachment means s and pin 7 can be clearly seen. Pin 7 will be secured, such as by welding, to the mating portion of chute 5. This pin and hook latch arrangement will be familiar to those skilled in the art.

An alternative embodiment of the present invention will be described with reference to FIGS. 4 and 5. This alternative embodiment is suitable for use at the end of a chute or at some intermediate position. Elements which are common with the prior embodiment have been numbered as such and the prior description applies to those elements. By reference to FIG. 4, it can be seen that the locking mechanism for securing the position of chute closure device 2 has been moved from the side of the chute to the top thereof. The locking mechanism 70 is slidably mounted on first horizontal portion 12, through the aperture 72. Like the prior embodiment, the latching mechanism 70 has a bolt portion 74. When the slide handle and stop 78 is in the forward position, the bolt 74 is in its looking position. When the handle 78 is in the rearward position, bolt 74 is out of engagement with the door mechanism and the door is free to pivot.

The door 60, like door 24, has a gasket 26 which is secured by a plurality of fasteners 28. In the prior embodiment, door 24 was sized so that the interior face of the door abutted the forward edge of main body member 4. In this embodiment, door 60 is still arcuately shaped so as to compliment the interior dimension of the main body member 4. The circumferential edge of door 60 is, preferably, substantially equal to the interior dimension of the main body member 4. The gasket 26 is designed to provide a slight wiping action and to seal the door in the chute to prevent liquid loss or leakage.

Figure 4:
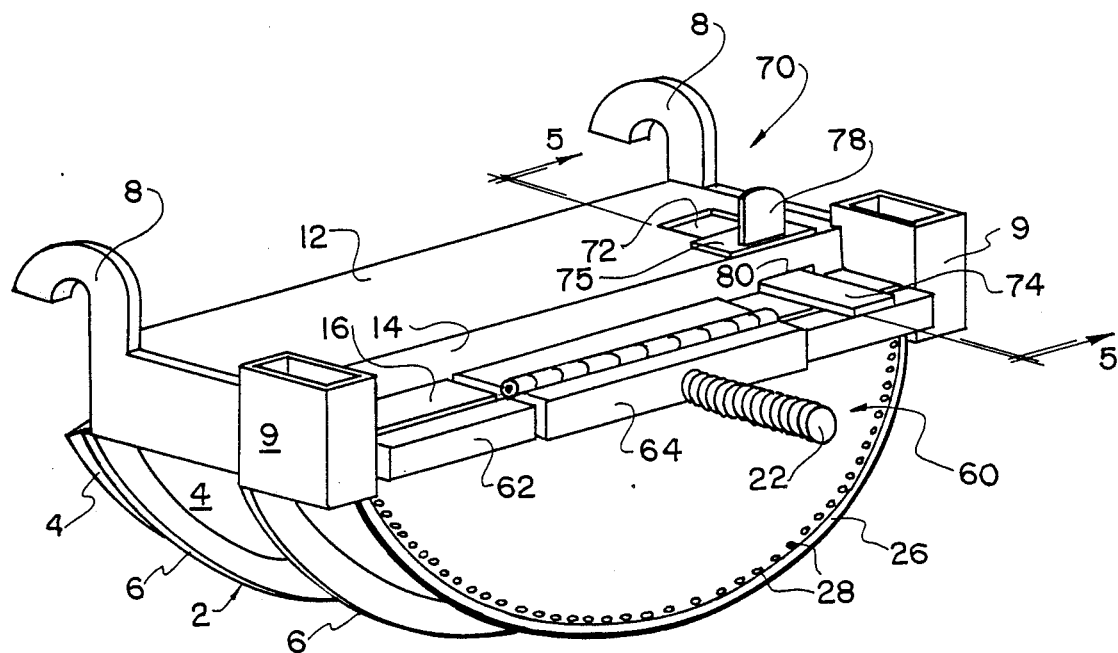
FIG. 4 is a perspective view of a second embodiment of the present invention, this embodiment may be used at the end of the sheet array or in midstream.

In the alternative embodiment of FIG. 4, the door 60 has a stiffening member 62. Elongated hinge 64 is mounted with a first side on the second horizontal portion 16 and the other side of the hinge 64 is on the stiffening member 62. In this embodiment, I presently prefer the use of a continuous hinge, however, multiple hinges may be used in accordance with the various designs as may be selected by one skilled in the art. In general, the hinge element must be of substantial size to withstand the potential forces which will build up behind the closed door and to avoid distortion of the hinge when the door is closed to interrupt the flow of material.

Figure 5:
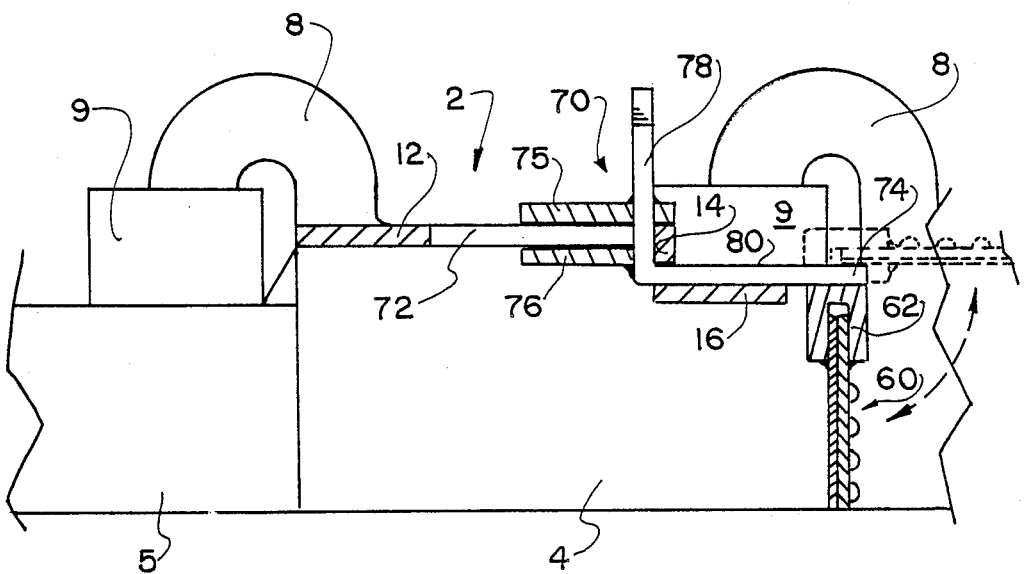
FIG. 5 is a diagrammatic partial section taken through the line 5—5 of FIG. 4 ; this figure illustrates one means of connecting the chute portions.

With reference now to FIGS. 4 and 5, the use of the alternative embodiment will be described further. As shown in FIG. 5, the closure device 2 is inserted between two sections of delivery chute 5. Although it is not depicted in FIGS. 4 and 5, it is preferred that the intermediate closure device include a latching mechanism 50 like the prior embodiment.

As can be seen with reference to FIG. 5, the locking mechanism 70 is movable within the slot 72. Note also that vertical portion 14 has been slotted at 80 to permit the bolt 74 to slide therethrough. Upper and lower sliding plates 75 and 76 respectively are secured to the combination handle and stop 78. The plate 75 and 76 are spaced by a distance which is slightly greater than the thickness of first horizontal portion 12. They are positively secured, such as by spotwelding, and permit easy sliding of the locking mechanism 70. When locking mechanism 70 is in its rearward most position, the end of bolt 74 rests within slot 80 of vertical proportion 14. When the locking mechanism 70 is in this position, the door 60 may be rotated to the full open position. As can be seen by reference to FIG. 5, the hinge 64 spaces the door 60 by a distance which is at least equal to the thickness of bolt 74. When door 60 is moved to its upward position, the latching mechanism 70 may be moved forward so that the bolt 74 proceeds into the gap 82 and beneath the interior surface of stiffening member 62. In this position, locking mechanism 70 Will retain the door in the open position. In the event that it is desirable to element the gap 82, the stiffening member 62 can be apertured to accept bolt 74.

With reference to FIG. 5, the closure 2 is attached to both sections of chute 5. In this embodiment the pin 7 of the prior embodiment has been replaced with an eyelet 9 to achieve a hook and eye mating system. The specific means of connecting the chute sections and the closure device 2 will depend on the system originally used by the chute manufacture. Alteration of the attachment means will normally not hinder operation of the invention. As can be from FIGS. 1-3, the exit or forward portion of this embodiment will be the terminal end of the chute and abutment of the door 24 will provide immediate control over the flow of material dispensed from the chute. Likewise, the embodiment shown in FIGS. 4 and 5 has a door 60 which rotates into abutment with the exit or forward portion of the disclosed apparatus to provide immediate control over the flow of material dispensed through the chute.

As can be seen from the forgone description, the present invention provides great flexibility with respect to the location and use of the disclosed device. In the primary field of cementitious materials, the flexibility of the present device will greatly simplify efforts to control the flow of material after it has been released from the mixing device.

What is claimed is:

1. A detachable flow control apparatus comprising:
a main body portion having rearward and forward open faces;
attachment means for detachably securing the rearward face of said main body portion to the terminal end of a delivery chute; and,
a rotatable flow interruption means which is dimensioned to abut the forward face of said main body portion and to achieve immediate flow control over material dispensed from the chute.

2. A delivery chute flow control apparatus comprising:
a body portion which mates with and extends the length of the delivery chute, said body portion having an entrance end and an exit end;
means for detachably securing said body portion to the terminal end of the delivery chute; and
rotatable flow interruption means positioned adjacent to the exit end of said body portion such that it rotates into abutment with the exit end and interrupts the flow of dispensed material through said exit end.

3. A detachable flow control apparatus for controlling the flow of liquid containing material through a length of delivery chute at a position which is spaced from the source of material flowing through the chute, said apparatus comprised of:
a body portion which mates with and defines a portion of the delivery chute length, said body portion having an entrance end and an exit end;
means for detachably securing said body portion to the terminal end of said delivery chute;
rotatable means for selectively interrupting the flow of material through the exit end of said body portion, said rotatable means includes a gasket portion which abuts the exit end of said body portion and restricts the flow of liquid from the liquid containing material; and
means for securing said rotatable means in a selected position.

4. A flow control apparatus comprising:
a main body portion having rearward and forward open faces;
attachment means for detachably securing the rearward face of said main body portion to the terminal end of a delivery chute;
a rotatable flow interruption means which is dimensioned to abut the forward open face of said main body portion and interrupt the flow through the chute at that point; and,
a locking mechanism for securing said flow interruption means in a selected position.

5. The apparatus of claim 4 further comprising:
latching means for detachably securing the rearward face of said main body portion to said delivery chute at a second location spaced apart from said attachment means.

6. The apparatus of claim 4 further comprising:
gasket means positioned at the abutment of said rotatable flow interruption means and the forward open face of said main body.

7. The apparatus of claim 6 further comprising:
latching means for detachably securing the rearward face of said main body portion to said delivery chute at a second location spaced apart from said attachment means.

8. The apparatus of claim 4 wherein said main body portion is arcuately shaped and has an open top.

9. The apparatus of claim 8 wherein said rotatable flow interruption means rotates about the top of the forward face of said main body portion.

10. The apparatus of claim 9 wherein said rotatable flow interruption means rotates through an arc of about 90°.

11. A delivery chute flow control apparatus comprising:
a body portion which mates with and extends the length of the delivery chute, said body portion having an entrance end and an exit end;
means for detachably securing the entrance end of said body portion to the terminal end of the delivery chute; and
flow interruption means secured adjacent to the exit end of said body portion to close said exit end and provide immediate control over the flow of material dispensed from the chute.

12. The apparatus of claim 11 further comprising:
locking means for securing said flow interruption means in a selected position.

13. The apparatus of claim 11 wherein said body portion is arcuately shaped and has an open top.

14. The apparatus of claim 11 wherein said flow interruption means rotates about the top of the exit end of said main body portion.

15. The apparatus of claim 14 wherein said flow interruption means rotates through an arc of about 90°.

16. The apparatus of claim 11 further comprising:
gasket means positioned at the abutment of said rotatable flow interruption means and the forward open face of said main body.

17. The apparatus of claim 16 further comprising:
locking means for securing said flow interruption means against rotation.

18. The apparatus of claim 17 wherein:
said locking means includes means for securing said flow interruption means in an open or closed positioned.

* * * * *

UNITED STATES PATENT AND TRADEMARK OFFICE
CERTIFICATE OF CORRECTION

PATENT NO. : 4,969,586
DATED : November 13, 1990
INVENTOR(S) : Michael Ostroski

It is certified that error appears in the above-identified patent and that said Letters Patent is hereby corrected as shown below:

At column 2, line 1, after the word "portion", insert --25--.

At column 2, line 67, after the word "FIGS.", insert --1,--.

At column 3, line 6, after the word "pin", insert --18--.

At column 3, line 37, after the word means, delete the letter "s" and insert therefor --8--.

At column 3, line 55, delete the word "looking" and insert therefor --locking--.

UNITED STATES PATENT AND TRADEMARK OFFICE
CERTIFICATE OF CORRECTION

PATENT NO. : 4,969,586

DATED : November 13, 1990

INVENTOR(S) : Michael Ostroski

It is certified that error appears in the above-identified patent and that said Letters Patent is hereby corrected as shown below:

At column 4, line 41, after the number "70", appears the word "Will" should read as --will--.

Signed and Sealed this

Twenty-third Day of June, 1992

Attest:

DOUGLAS B. COMER

*Attesting Officer*      *Acting Commissioner of Patents and Trademarks*